United States Patent
Sha et al.

(10) Patent No.: US 10,678,971 B2
(45) Date of Patent: Jun. 9, 2020

(54) SPACE EXPLORATION WITH BAYESIAN INFERENCE

(71) Applicant: International Business Machines Corporation, Armonk, NY (US)

(72) Inventors: Jing Sha, White Plains, FL (US); Dongbing Shao, Wappingers Falls, NY (US); Derren Dunn, Sandy Hook, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/040,834

(22) Filed: Jul. 20, 2018

(65) Prior Publication Data

US 2020/0026807 A1 Jan. 23, 2020

(51) Int. Cl.
| | |
|---|---|
| *G06F 17/50* | (2006.01) |
| *G06F 30/20* | (2020.01) |
| *G06N 7/00* | (2006.01) |
| *G03F 7/20* | (2006.01) |
| *G06F 30/39* | (2020.01) |
| *G06N 20/00* | (2019.01) |
| *G06F 111/08* | (2020.01) |
| *G06F 119/18* | (2020.01) |

(52) U.S. Cl.
CPC ............. *G06F 30/20* (2020.01); *G03F 7/705* (2013.01); *G03F 7/70441* (2013.01); *G06F 30/39* (2020.01); *G06N 7/005* (2013.01); *G06F 2111/08* (2020.01); *G06F 2119/18* (2020.01); *G06N 20/00* (2019.01)

(58) Field of Classification Search
CPC ............. G06F 17/5009; G06F 17/5068; G06F 2217/10; G06F 2217/12; G03F 7/705; G03F 7/70441; G06N 7/005; G06N 20/00
USPC .................................... 716/50–56; 430/5, 30
See application file for complete search history.

(56) References Cited

U.S. PATENT DOCUMENTS

| | | | | |
|---|---|---|---|---|
| 10,257,275 | B1* | 4/2019 | Dirac ....................... | G06N 5/02 |
| 2012/0107969 | A1* | 5/2012 | Fischer ................... | G03F 7/705 |
| | | | | 438/16 |

(Continued)

OTHER PUBLICATIONS

Reagen et al., A Case for Efficient Accelerator Design Space Exploration via Bayesian Optimization, IEEE, 2017 (Year: 2017).*

(Continued)

*Primary Examiner* — Nghia M Doan
(74) *Attorney, Agent, or Firm* — Fleit Intellectual Property Law; Jon Gibbons

(57) ABSTRACT

A system, a computer program product, and method for physically fabricating an electronic circuit using design space exploration as part of a design process is described. The method begins with defining a plurality of design space parameters to be tuned along with parameter ranges for each of the plurality of design space parameters. Next an output target to be optimized is defined. A series of one or more test mask shapes are generated to appear on a photo mask using the plurality of design space parameters. A simulation of a post lithography or etch on the series of one or more test mask shapes is performed to produce simulation output values. Next, the simulation output values and corresponding design space parameters are fed into to a Bayesian inference algorithm for assessment and identification of a next combination of design space parameters to investigate.

18 Claims, 8 Drawing Sheets

(56) References Cited

U.S. PATENT DOCUMENTS

| | | |
|---|---|---|
| 2014/0173537 A1 | 6/2014 | Mohanty et al. |
| 2018/0046072 A1 | 2/2018 | Lutich |
| 2018/0095936 A1* | 4/2018 | Bonnecaze ....... H01J 37/32009 |

OTHER PUBLICATIONS

Kayri, Preditive Abilities of Bayesian Regularization and Levenberg-Marquardt Algorithms in Artificial Neural Networks: A Comparative Empirical Study on Social Data, Mathematical and Computational Applications, May 2016 (Year: 2016).*

Meghali J. Chopra; Rahul Verma; Austin Lane; C. G. Willson; Roger T. Bonnecaze, "A Method to Accelerate Creation of Plasma Etch Recipes using Physics and Bayesian Statistics" Proc. of SPIE, vol. 10149, 101490X 2017.

A. Savino, "ReDO: Cross-Layer Multi-Objective Design-Exploration Framework for Efficient Soft Error Resilient Systems," IEEE Transactions on Computers, Mar. 23, 2018 (early access version) doi: 10.1109/TC.2018.2818735. Mar. 23, 2018.

B. Reagen, "A case for efficient accelerator design space exploration via Bayesian optimization," 2017 IEEE/ACM International Symposium on Low Power Electronics and Design (ISLPED), Taipei, pp. 1-6. 2017.

Andrew Burbine et al., Bayesian Inference for OPC Modeling, Proc. of SPIE, vol. 9780, 97800I 2016.

D. Li, "Efficient design space exploration via statistical sampling and AdaBoost learning." In Proceedings of the 53rd Annual Design Automation Conference (DAC '16). ACM, New York, NY, USA, Article 142, 6 pages 2016.

Tuhin Guha Neogi et al., Design Space Analysis of Novel Interconnect Constructs for 22nm FDX Technology, Proc. of SPIE, vol. 10148, 101480Z 2017.

Andrey Lutich, Design space sampling using hierarchical clustering of patterns on a full chip, Proc. of SPIE, vol. 10148, 101480T 2017.

G. Mariani, "A correlation-based design space exploration methodology for multi-processor systems-on-chip." In Proceedings of the 47th Design Automation Conference (DAC '10). ACM, New York, NY, USA, 120-125 2010.

M. Ziegler, "A Scalable Black-Box Optimization System for Auto-Tuning VLSI Synthesis Programs." Proceedings of 1st Workshop on Resource Awareness and Application Autotuning in Adaptive and Heterogeneous Computing (RES4ANT) 2016.

N. Kapre, "Driving Timing Convergence of FPGA Designs through Machine Learning and Cloud Computing," 2015 IEEE 23rd Annual International Symposium on Field-Programmable Custom Computing Machines, Vancouver, BC, pp. 119-126. 2015.

Meghali Chopra et al., Rapid Recipe Formulation for Plasma Etching of New Materials, Proc. of SPIE, vol. 9781, 978111 2016.

* cited by examiner

SPACE EXPLORATION WITH BAYESIAN INFERENCE

BACKGROUND

The present disclosure generally relates to the field of integrated circuit design, and more particularly relates to design process technology co-optimization (DTCO).

Design space exploration has become a difficult problem due to the exponentially increasing size of design space of microprocessors and time-consuming simulations.

To address this issue, machine learning techniques have been widely employed to build predictive models. However, most previous approaches randomly sample the training set leading to considerable simulation cost and low prediction accuracy.

Design space exploration for DTCO is crucial for design rule development and failure mode analysis. Design space exploration is computationally expensive, especially when full factorial.

Current solutions and challenges are 1) generate all the critical patterns a design can think of; 2) run simulation on all generated patterns by Monte Carlo, and 3) find worst case scenarios based on simulation results.

Further the pattern coverage is limited by pattern complexity, generation, and storage. And the simulation is computationally expensive and does not scale well to high-dimensional design space.

SUMMARY

Disclosed is a system, computer program product, and method for finding an efficient approach to design space exploration. The method begins with defining a plurality of design space parameters to be tuned along with parameter ranges for each of the plurality of design space parameters. Next an output target to be optimized is defined. A series of one or more test mask shapes are generated to appear on a photo mask using the plurality of design space parameters. A simulation of a post lithography or etch on the series of one or more test mask shapes is performed to produce simulation output values. Next, the simulation output values and corresponding design space parameters are fed into to a Bayesian inference algorithm for assessment and identification of a next combination of design space parameters to investigate. The process above is repeated until a maximum or a minimum output is achieved due to the Bayesian inference algorithm duplicating combinations of design space parameters to investigate. In one example the Bayesian inference is reasonable because the combinations of design space parameters to investigate converge to a single combination. In another example, the Baysesian inference is better than grid search because the combination of design space parameters to investigate is less than all possible combinations of the design space parameters.

Physical design synthesis with a computer is performed to physically implement at least one electronic circuit based on the series of one or more test mask shapes using the plurality of design space parameters.

In the case in which the generated mask shapes are polygon options drawn exactly to post-etch shapes that appear on a wafer. Then in this case, the polygon options for drawn is followed by retargeting which takes into account an etch process. Next, optical proximity correction is used to compensate for image errors due to diffraction or process effects during lithography and to transform the series of one or more post-lithographic target shapes into the photo-mask.

In the case in which the generated mask shapes are polygon options are a post-lithographic target shape on wafer. Then in this case, the polygon options for target is followed by optical proximity correction to compensate for image errors due to diffraction or process effects during lithography and to transform the series of one or more post-lithographic target shapes into the photo-mask.

In the case in which the generated mask shapes are polygon options, then these polygon options are applied directly to a photo-mask shape.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1A:
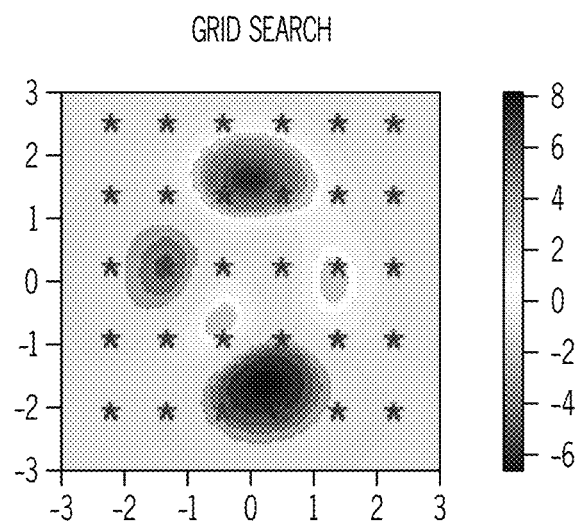
FIG. 1(a) through FIG. 1(c) is graph of a comparison of strategies of searching for a global maximum or global minimum.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

In order to meet the increasing performance requirements at the cost of given budget, modern integrated circuits have been adopting more and more complex architectures. When designing a new integrated circuits, one major challenge is to find the promising architectural configurations in design space to satisfy different performance, power, and cost constraints. Generally, computer architects use cycle-accurate simulators to run benchmarks to evaluate different design architecture parameter combinations. The software simulator is often several orders of magnitude slower than the execution on real hardware. Therefore, full-search exploration of a wide range of architecture parameters is infeasible.

In the past decade, in order to address the architectural design space exploration (DSE), previous works mainly focus on two directions. One direction is to investigate fast simulation techniques.

However, the reduced time based on speeding up simulation is quite limited, since the design space is still extremely huge. The other direction is to use machine learning techniques to build regression models with a set of simulations to predict the unknown architectural responses, which can usually achieve desirable results.

However, as the simulation is time-consuming and the design space is extremely large, it is essential for DSE to sample a small training set for predictive model to learn the relationships between parameters and responses accurately. Most traditional approaches randomly sample a training data set from the entire design space to build regression models. The problem of such method is that the sampled training data cannot fully represent the distribution of the entire sample space. Active learning has been proposed and semi-supervised learning to improve the accuracy of predictive model. However typically their initial training set are randomly sampled and accounted for a large proportion of the entire training data.

Since the above approaches ignored the training set sampling strategy, they suffered from either higher simulation costs or lower prediction accuracy.

Current solutions generate all the critical patterns a designer can think of. This results in limited pattern coverage is limited by pattern complexity, generation, and storage. Next simulation is run on all the generated patterns, for example by a Monte Carlo algorithm. Simulation is expensive and does not scale well to high-dimensional design space. The worst-case scenarios are found based on simulation results.

The present invention provides an efficient approach to design space exploration. A fully automated workflow and system of design space exploration with parametric construct templates. More specifically, design space exploration in the present invention is framed as an optimization problem mainly searching for worst-case scenarios.

Bayesian inference guides exploration in the high-dimensional design space to find the maximum or minimum output target, without knowledge of any model. The present invention has numerous advantages. One advantage is that Bayesian inference is more efficient than grid search or random search. This is especially true when the output of cost function is expensive to evaluate e.g. costly or time-consuming simulations/experiments, and there is no knowledge of the process model so it is viewed as a "black box function". The function can solely be viewed in terms of its inputs and outputs or transfer characteristics, without any knowledge of its internal workings.

Another advantage is the present invention is model free meaning that there is no need for empirical or physical model to describe the specific process.

Still another advantage is the present invention only generates necessary patterns based on the feedback of Bayesian inference. Unlike prior design space exploration techniques, there is no need to generate all the sample patterns. This saves large amounts of computational resources including disk space and pattern generation runtime.

Non-Limiting Definitions

The terms "a", "an" and "the" are intended to include the plural forms as well, unless the context clearly indicates otherwise.

"Bayesian inference" derives the posterior probability as a consequence of two antecedents: a prior probability and a "likelihood function" derived from a statistical model for the observed data. Bayesian inference computes the posterior probability according to Bayes' theorem. See online URL <https://en.wikipedia.org/wiki/Bayesian_inference#Bayesian_prediction>. Bayesian theory calls for the use of the posterior predictive distribution to do predictive inference, i.e., to predict the distribution of a new, unobserved data point. That is, instead of a fixed point as a prediction, a distribution over possible points is returned. Only this way is the entire posterior distribution of the parameter(s) used.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "design space parameters" are measurable factors in semiconductor manufacturing. Design space parameters include measurements of features, such as length, width, height, pitch along a given x-axis, y-axis, or z-axis of gate, source, drain, and core portions. Typically, parameter ranges are set for design space parameters.

"High dimensional space" is a design space with more than two parameters and many times has hundreds of parameters.

The term "synthesis" is an umbrella term that implies both logic and physical synthesis. For physical synthesis, gate placement and additional optimization would be performed by the physical synthesis step. The logic aspect of synthesis is called logic synthesis which in electronics is a process by which an abstract form of desired circuit behavior, typically at register transfer level (RTL), is turned into a design implementation in terms of logic gates, typically by a computer program called a synthesis tool. Common examples of this process include synthesis of HDLs, including VHDL and Verilog. Some synthesis tools generate bitstreams for programmable logic devices such as PALs or FPGAs, while others target the creation of ASICs. Logic synthesis is one aspect of electronic design automation.

Overview of Searching for a Global Maximum or Global Minimum

Figure 1B:
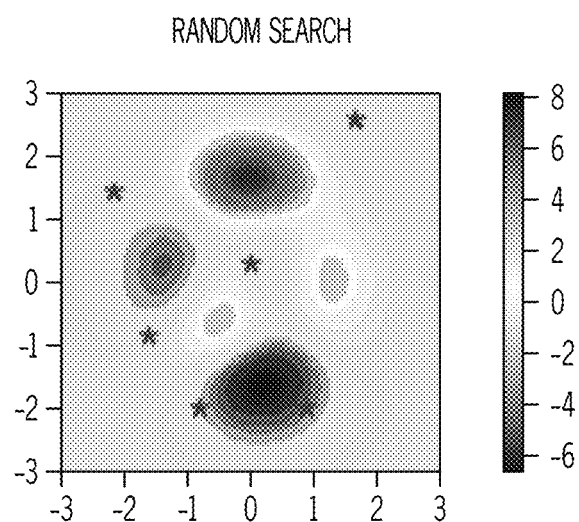
Figure 1C:
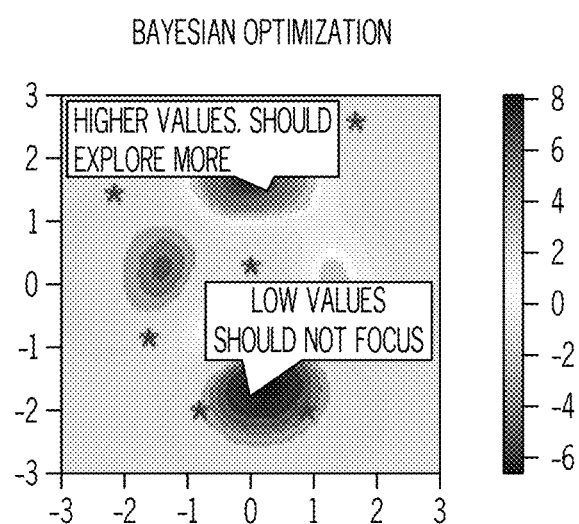

As stated above design space exploration can be framed as an optimization problem mainly searching for worst case scenarios. Turning now to FIG. 1(a) through FIG. 1(c) shown is a comparison of strategies of searching for a global maximum or global minimum. In this example the following problem is used:

$$x^* = \arg\max_{x} f(x)$$

where f is a black box function with no knowledge of an underlying process and f is expensive to evaluation in terms of computational costs and time.

Starting with the grid search on the left side of FIG. 1(a), it is easiest to implement. However the shortcoming is dimensionality: $O(k^n)$ the complexity of trying k different values for each of n parameters. As stated above design space exploration can be framed as an optimization problem mainly searching for worst case scenarios.

Continuing with the middle diagram FIG. 1(b) a random search is shown. The random search can exploit important parameters more efficiently than grid search. The random search scales well in high dimensional parameter space. However, the coverage in a random search can be poor.

Continuing still further, to FIG. 1(c) is a Bayesian optimization search. The search begins with a random search and then applies the Bayesian inference algorithm. The overall flow is: Prior belief→Search the parameter space-→Evaluate→Update prior belief→Repeat.

As can be seen, the Bayesian Optimization search of FIG. 1(c) performs better than grid of FIG. 1(a) and the r random search of FIG. 1(b).

Figure 2:
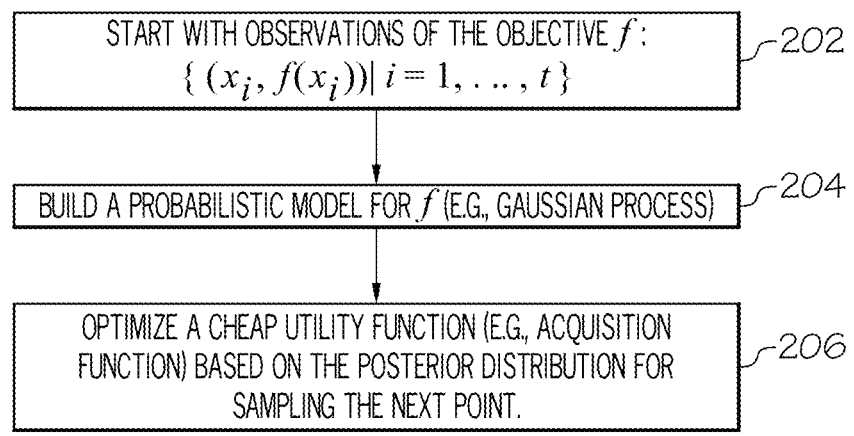
FIG. 2 is an overall flow diagram of an acquisition function to select a next point to evaluate in an objective function.

FIG. 2 is an overall flow diagram of use of an acquisition function to select a next point to evaluate in an objective function. Starting with step 202, an observation recorded over time compared with an objective function (f) 204. The observation or measurement of the objective f $\{(x_i, f(x_i)) | i=1, \ldots, t\}$ as shown. In this example a Gaussian process is selected as a probabilistic model for f as shown in step 204. Next in step 206 that converges with the objective is performed by optimizing a cheap utility function, e.g., an acquisition function based on the posterior distribution for sampling the next point. In this case, there is a high value of acquisition function that corresponds to potentially high value of the objective function because 1) the prediction is high, 2) the uncertainty is great, or 3) both. The acquisition function is used to select the next point at which to evaluate the objective function. The acquisition function or Bayesian inference algorithm will automatically explore these regions of high uncertainty in the identification of the next combination of design space parameters to investigate.

Figure 3:
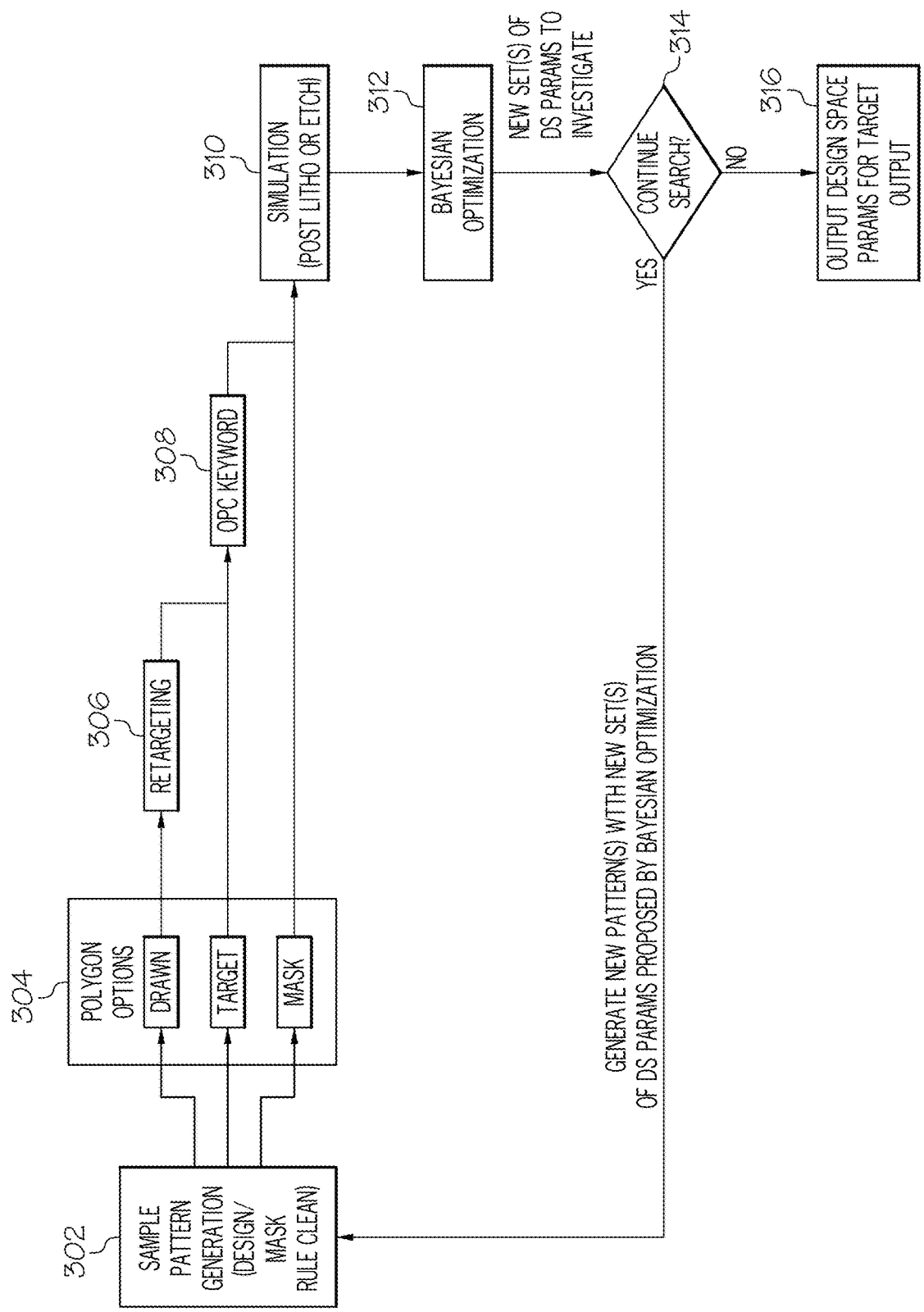
FIG. 3 is a flow diagram of the automated design space exploration with Bayesian feedback optimization.

FIG. 3 is a flow diagram of the automated design space exploration with Bayesian feedback optimization. The process begins with a layout pattern generation or sample pattern generation in step 302. The sample pattern generation is based on the design space parameters to be tuned along with parameter ranges for each of the plurality of design space parameters. These may be the design shapes from a designer as initial set of shapes with the design space parameters. These sample test patterns are typically polygons.

Next is step 304 three polygon options are possible "drawn", "target", and "mask". The polygon option drawn is the initial set of shapes exactly to post-etch shapes that appear on a wafer. This process is followed by retargeting in step 306 which takes into account an etch process. In the case in which the polygon option is "target" a post-lithographic target shape on wafer. The third option is "mask" shapes using the plurality of design space parameters includes polygon options directly to a photo-mask shape.

In the case of "drawn" and "target" polygon options, optical proximity correction (OPC) are used in step 308 to compensate for image errors due to diffraction or process effects during lithography and to transform the series of one or more post-lithographic target shapes into the photo-mask.

The "drawn", "target", and "mask" polygon options all flow into a process simulation step 310 as photo-mask shapes. Generated from the simulation 310 is simulated process output values or critical dimensions based on the design space parameters.

The design space parameters along with the simulated output values are inputs into step 312 in which a Bayesian inference algorithm is used. The Bayesian inference algorithm 312 performs an assessment by adding one more observation to its prior belief. The Bayesian inference algorithm points to a region in the design space where either the uncertainty of the prior belief may be large or a maximum or a minimum exists are identified by the Bayesian inference identifies new sets of design space parameters in those uncertain regions to investigate for observations or simulation output values.

In step 314, a test if a maximum or minimum output from the Bayesian optimization is achieved. The optimization is achieved typically in response to the Bayesian inference algorithm producing duplicate combinations of design space parameters to investigate or not finding other combinations of design space parameters for a new maximum or minimum output. If there is no convergence for the combination of design space parameters to investigate, the process loops back to step 302 to begin again. Otherwise, if the combination of design space parameters to investigate in step 316 converges, the output for the given design space parameters is complete.

Figure 4A:
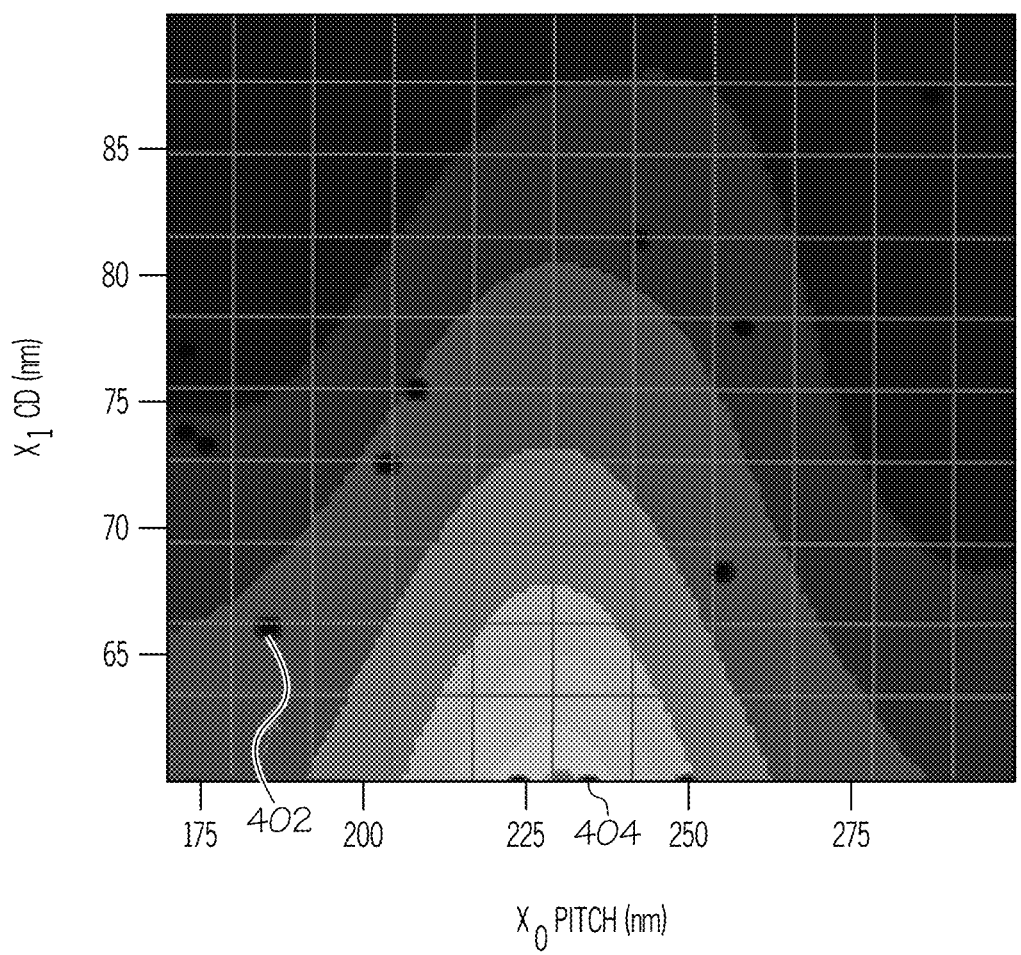
FIGS. 4(a) through 4(c) is example layer patterning assessment by the Bayesian inference algorithm.
Figure 4B:
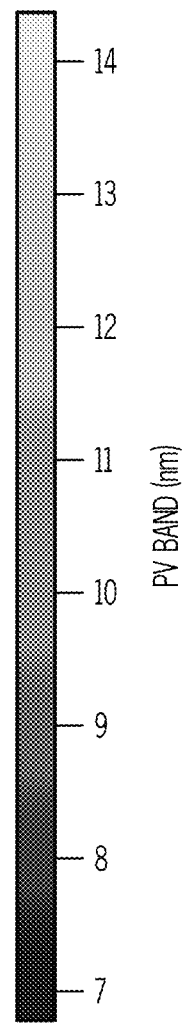
Figure 4C:
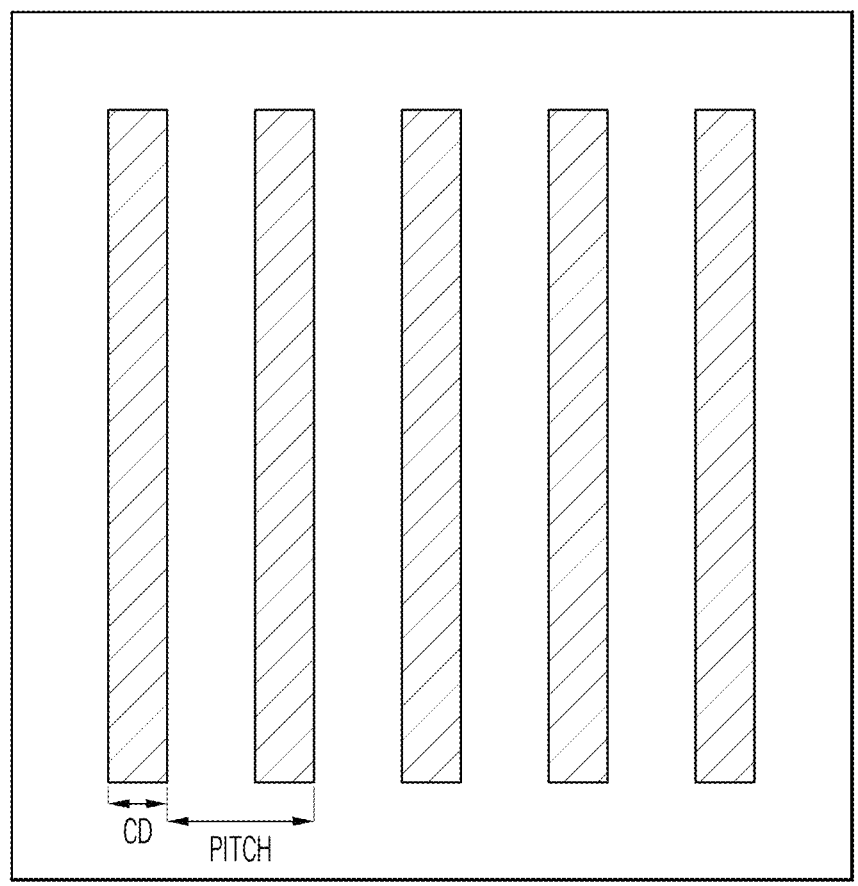

Turning now to FIGS. 4(a) through 4(c) is example layer patterning assessment by the Bayesian inference algorithm. In this example case, the design goal is searching for the largest PV band of through pitch line patterns. Only two parameters are optimized, i.e. CD and pitch, for easy demonstration and visualization. The PV band width of a line pattern is a function of CD and pitch as shown here in FIG. 4(c). But without any prior knowledge of this, the design goal in this example is to find the CD and pitch combination for the maximum PV band width corresponding to the worst case scenario.

In this example a 1) randomly select a pair of Pitch (X0) and CD (X1) in the design space; 2) retrieve PV Band with simulation, and 3) assess the new data point (Pitch, CD, PV Band) for the next pair of Pitch (X0) and CD (X1) to evaluate. Repeat 2-3 until convergence to a maximum PV Band is achieved. Black dots 502 are sampled pitch and critical dimension (CD) for evaluation. These Black Dots are randomly distributed. Red dot 404 is the found maximum PV Band by Bayesian inference algorithm. The color gradient 406 is the estimated by Bayesian inference algorithm. In this example, only four iterations were needed to achieved the maximum PV Band 404. Compared to other types of searches e.g. grid search FIG. 1(a), or random FIG. 1(b), this Bayesian inference greatly reduces the number of simulations to find maximum target output. The benefits when optimizing in high-dimensional design space is clearly shown.

Design Structure

Figure 5:
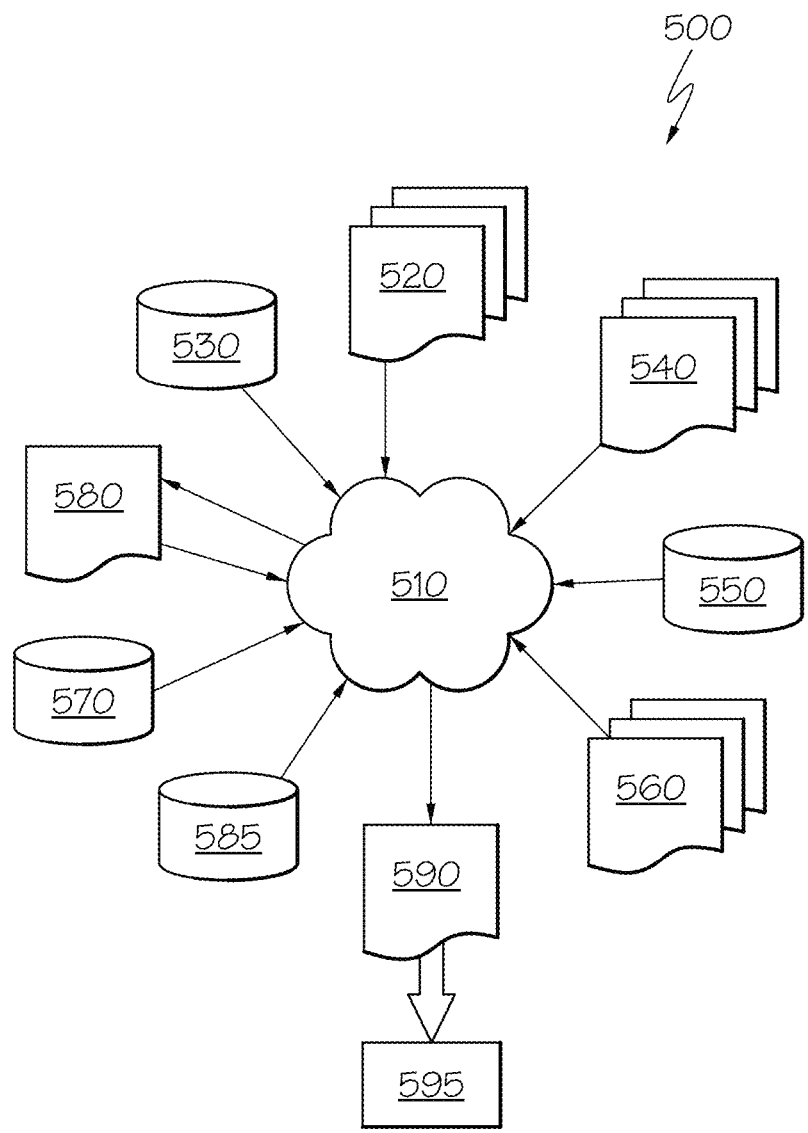
FIG. 5 is a block diagram of an exemplary design flow.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system such as those described in the figures above. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL), design entities, or other data structures conforming to and/or compatible with lower-level HDL design languages such as Verilog and VHDL, and/or higher-level design languages such as C or C++.

Design process 510 preferably employs and incorporates hardware and/or software modules for synthesizing, translating, or otherwise processing a design/simulation functional equivalent of the components, circuits, devices, or logic structures described in the figures above to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585, which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system, generate a logically or otherwise functionally equivalent form of one or more of the embodiments of the invention shown in FIGS. 1-4. In one embodiment, design structure 590 may comprise a compiled, executable HDL simulation model that functionally simulates the devices shown in FIGS. 1-5.

Design structure 590 may also employ a data format used for the exchange of layout data of integrated circuits and/or symbolic data format (e.g., information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-4. Design structure 590 may then proceed to a stage 595 where, for example, design structure 590: proceeds to tape-out, is released to manufacturing, is released to a mask house, is sent to another design house, is sent back to the customer, etc.

Computer Program Product Example

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for physically fabricating an electronic circuit using design space exploration as part of a design process, the method comprising:
   a) defining a plurality of design space parameters to be tuned along with parameter ranges for each of the plurality of design space parameters;
   b) selecting polygon options as an initial set of shape that are drawn to match post-etch shapes that appear on a wafer;
   c) generating a series of one or more test mask shapes to appear on a photo mask using the plurality of design space parameters and the selected polygon options;
   d) simulating at least one of a post lithography or etch on the series of one or more test mask shapes to produce simulation output values;
   e) feeding the simulation output values and corresponding design space parameters to a Bayesian inference algorithm for assessment and identification of a next combination of design space parameters to investigate;
   repeating steps c through e until a maximum or a minimum output is achieved due to the Bayesian inference algorithm duplicating combinations of design space parameters to investigate or not finding a new maximum or minimum output with any other combinations of design space parameters; and performing physical design synthesis with a computer to physically implement at least one electronic circuit based on the series of one or more test mask shapes using the next combination of design space parameters.

2. The method of claim 1, wherein the generating the series of one or more test mask shapes using the plurality of design space parameters includes polygon options drawn exactly to post-etch shapes that appear on a wafer, followed by retargeting which takes into account an etch process, and optical proximity correction to compensate for image errors due to diffraction or process effects during lithography and to transform the series of one or more test mask shapes, which are post-lithographic target shapes, into a photo-mask.

3. The method of claim 1, wherein the generating the series of one or more test mask shapes using the plurality of design space parameters includes polygon options to target a post-lithographic target shape on wafer, followed by optical proximity correction to compensate for image errors due to diffraction or process effects during lithography and to transform the series of one or more test mask shapes, which are post-lithographic target shapes, into a photo-mask.

4. The method of claim 1, wherein the generating the series of one or more test mask shapes using the plurality of design space parameters includes polygon options directly to a photo-mask shape.

5. The method of claim 1, wherein the repeating steps c through e until the maximum or the minimum output is achieved due to the combinations of design space parameters to investigate converge to a single combination.

6. The method of claim 1, wherein the repeating steps c through e until the maximum or the minimum output is achieved due to the combination of design space parameters to investigate is less than all possible combinations of the design space parameters.

7. A system for physically fabricating an electronic circuit using design space exploration as part of a design process, the system comprising:
 a memory;
 a processor communicatively coupled to the memory, where the processor is configured to perform
 a) defining a plurality of design space parameters to be tuned along with parameter ranges for each of the plurality of design space parameters;
 b) selecting polygon options as an initial set of shape that are drawn to match post-etch shapes that appear on a wafer;
 c) generating a series of one or more test mask shapes to appear on a photo mask using the plurality of design space parameters and the selected polygon options;
 d) simulating at least one of a post lithography or etch on the series of one or more test mask shapes to produce simulation output values;
 e) feeding the simulation output values and corresponding design space parameters to a Bayesian inference algorithm for assessment and identification of a next combination of design space parameters to investigate;
 repeating steps c through e until a maximum or a minimum output is achieved due to the Bayesian inference algorithm duplicating combinations of design space parameters to investigate or not finding a new maximum or minimum output with any other combinations of design space parameters; and performing physical design synthesis with a computer to physically implement at least one electronic circuit based on the series of one or more test mask shapes using the next combination of design space parameters.

8. The system of claim 7, wherein the generating the series of one or more test mask shapes using the plurality of design space parameters includes polygon options drawn exactly to post-etch shapes that appear on a wafer, followed by retargeting which takes into account an etch process, and optical proximity correction to compensate for image errors due to diffraction or process effects during lithography and to transform the series of one or more test mask shapes, which are post-lithographic target shapes, into a photo-mask.

9. The system of claim 7, wherein the generating the series of one or more test mask shapes using the plurality of design space parameters includes polygon options to target a post-lithographic target shape on wafer, followed by optical proximity correction to compensate for image errors due to diffraction or process effects during lithography and to transform the series of one or more test mask shapes, which are post-lithographic target shapes, into a photo-mask.

10. The system of claim 7, wherein the generating the series of one or more test mask shapes using the plurality of design space parameters includes polygon options directly to a photo-mask shape.

11. The system of claim 7, wherein the repeating steps c through e until the maximum or the minimum output is achieved due to the combinations of design space parameters to investigate converge to a single combination.

12. The system of claim 7, wherein the repeating steps c through e until the maximum or the minimum output is achieved due to the combination of design space parameters to investigate is less than all possible combinations of the design space parameters.

13. A computer program product for physically fabricating an electronic circuit using design space exploration as part of a design process, the computer program product comprising a computer readable storage medium having program instructions embodied therewith, the program instructions executable by a computer to cause the computer to:
 a) defining a plurality of design space parameters to be tuned along with parameter ranges for each of the plurality of design space parameters;
 b) selecting a polygon option as an initial set of shape that are drawn to match post-etch shapes that appear on a wafer;
 c) generating a series of one or more test mask shapes to appear on a photo mask using the plurality of design space parameters and the selected polygon option;
 d) simulating at least one of a post lithography or etch on the series of one or more test mask shapes to produce simulation output values;
 e) feeding the simulation output values and corresponding design space parameters to a Bayesian inference algorithm for assessment and identification of a next combination of design space parameters to investigate;
 repeating steps c through e until a maximum or a minimum output is achieved due to the Bayesian inference algorithm duplicating combinations of design space parameters to investigate or not finding a new maximum or minimum output with any other combinations of design space parameters; and performing physical design synthesis with a computer to physically implement at least one electronic circuit based on the series of one or more test mask shapes using the next combination of design space parameters.

14. The computer program product of claim 13, wherein the generating the series of one or more test mask shapes using the plurality of design space parameters includes polygon options drawn exactly to post-etch shapes that appear on a wafer, followed by retargeting which takes into account an etch process, and optical proximity correction to compensate for image errors due to diffraction or process effects during lithography and to transform the series of one or more test mask shapes, which are post-lithographic target shapes, into a photo-mask.

15. The computer program product of claim 13, wherein the generating the series of one or more test mask shapes using the plurality of design space parameters includes polygon options to target a post-lithographic target shape on wafer, followed by optical proximity correction to compensate for image errors due to diffraction or process effects during lithography and to transform the series of one or more test mask shapes, which are post-lithographic target shapes, into a photo-mask.

16. The computer program product of claim 13, wherein the generating the series of one or more test mask shapes using the plurality of design space parameters includes polygon options directly to a photo-mask shape.

17. The computer program product of claim 13, wherein the repeating steps c through e until the maximum or the minimum output is achieved due to the combinations of design space parameters to investigate converge to a single combination.

18. The computer program product of claim 13, wherein the repeating steps c through e until the maximum or the minimum output is achieved due to the combination of design space parameters to investigate is less than all possible combinations of the design space parameters.

* * * * *